United States Patent
Zhang et al.

(10) Patent No.: US 10,033,690 B2
(45) Date of Patent: Jul. 24, 2018

(54) COMMUNICATION METHOD, WIRELESS ACCESS POINT, WIRELESS CONTROLLER AND COMMUNICATION SYSTEM

(71) Applicant: Sangfor Technologies Company Limited, Shenzhen (CN)

(72) Inventors: Zhiliang Zhang, Shenzhen (CN); Jingbo Liang, Shenzhen (CN)

(73) Assignee: SANGFOR TECHNOLOGIES INC., Shenzhen (CN)

( * ) Notice: Subject to any disclaimer, the term of this patent is extended or adjusted under 35 U.S.C. 154(b) by 171 days.

(21) Appl. No.: 15/016,509

(22) Filed: Feb. 5, 2016

(65) Prior Publication Data

US 2016/0278001 A1   Sep. 22, 2016

(30) Foreign Application Priority Data

Mar. 19, 2015 (CN) .......................... 2015 1 0122699

(51) Int. Cl.
*H04L 29/08* (2006.01)
*H04L 29/12* (2006.01)

(52) U.S. Cl.
CPC ...... *H04L 61/1511* (2013.01); *H04L 61/2015* (2013.01)

(58) Field of Classification Search
CPC .................................................. H04L 61/1511
USPC ........................................................ 709/224
See application file for complete search history.

(56) References Cited

U.S. PATENT DOCUMENTS

2013/0114463 A1* 5/2013 Li .......................... H04W 48/18
                                                                        370/254

* cited by examiner

*Primary Examiner* — Adnan Mirza
(74) *Attorney, Agent, or Firm* — Anova Law Group, PLLC

(57) ABSTRACT

A communication method includes automatically sending a DHCP discovery request to a DHCP server after power on; receiving network configuration parameters assigned by the DHCP server responding to the DHCP discovery request; and sending a predefined domain name query request for a predefined domain name according to a network address of a DNS server included in the network configuration parameters. The domain name query request passes through a wireless controller. The method also includes, after the wireless controller intercepts the predefined domain name query request by monitoring domain name query requests passing through the wireless controller, receiving a simulated domain name query reply packet from the wireless controller responding to the predefined domain name query, wherein the domain name query reply packet includes a predefined network address corresponding to the predefined domain name; and communicating with the wireless controller according to the predefined network address.

13 Claims, 6 Drawing Sheets

COMMUNICATION METHOD, WIRELESS ACCESS POINT, WIRELESS CONTROLLER AND COMMUNICATION SYSTEM

CROSS-REFERENCES TO RELATED APPLICATIONS

This application claims priority of Chinese Application No. 201510122699.3, filed on Mar. 19, 2015, the entire contents of which are hereby incorporated by reference.

FIELD OF THE INVENTION

The present disclosure generally relates to the field of wireless network access technology and, more particularly, relates to a communication method, a wireless access point, a wireless controller and a communication system.

BACKGROUND

With the development of wireless technology, wireless local area network (WLAN) products have developed from single autonomous wireless access points (AP) to access control systems consisting of wireless access controllers (WAC) and wireless access points. The access point or AP is an equipment for converting a wireless network to a wired network, and the wireless access controller or WAC is used for the configuration and management of wireless access points. Because there is a need to deploy a large number of wireless access points to provide a wireless access service to users, the problem of the configuration and maintenance of a large number of wireless access points needs to be solved, which makes it necessary to use wireless controllers to conduct centralized configuration and management for the wireless access points. The discovery of a wireless controller by a wireless access point is among the first problems to be solved.

The traditional discovery of a wireless controller by a wireless access point can be classified into two-layer network discovery and across-three-layer network discovery. A two-layer network is a network that is on the same network segment, such as the network segment 192.168.1/24, and what belongs to this network segment belongs to the same two-layer network. A network with communications across different network segments is called an across-three-layer network. A typical address resolution protocol (ARP) broadcast is broadcasted on a two-layer network, so an ARP broadcast cannot be transmitted across network segments.

On a two-layer network, an access point can easily discover a wireless controller. In an across-three-layer network discovery, the domain name of a wireless controller is obtained through a dynamic host configuration protocol (DHCP) server, then the domain name request of the wireless controller is sent to the domain name system (DNS) server of the company internal network, also called intranet, through the wireless access point, and the internet protocol (IP) address of the wireless controller is thus obtained, and eventually the discovery of a wireless controller by a wireless access point is achieved. Another approach for discovery of a wireless controller by a wireless access point in an across-three-layer network environment is, by configuring the Option 43 field of a DHCP server, the wireless access point obtains the IP address of the wireless controller through the Option 43 field, at the same time when the wireless access point obtains the network configuration.

However, in a complex company environment, deployment of a large number of wireless access points is often needed to achieve the wireless network coverage, and it may be impossible that all the wireless access points and the wireless controllers are on the same two-layer network. Therefore, it is almost impossible for a wireless access point to discover a wireless controller only through a discovery method of a two-layer network, and the discovery of a wireless controller by a wireless access point in an across-three-layer network becomes more common. However, currently, in an across-three-layer network environment, the discovery of a wireless controller by a wireless access point require either additional company internal DNS servers, or reconfiguration of the DHCP server, increasing the deployment and maintenance cost of the wireless network coverage for a company.

It should be noted that the above information is only used to assist in understanding the technical aspects of the present invention, and it does not represent that such information is prior art. The disclosed methods and systems are directed to solve one or more problems set forth above and other problems in the art.

BRIEF SUMMARY OF THE DISCLOSURE

One aspect of the present disclosure includes a communication method. The method includes automatically sending a DHCP discovery request to a DHCP server after power on; receiving network configuration parameters assigned by the DHCP server responding to the DHCP discovery request; and sending a predefined domain name query request for a predefined domain name according to a network address of a DNS server included in the network configuration parameters. The domain name query request passes through a wireless controller. The method also includes, after the wireless controller intercepts the predefined domain name query request by monitoring domain name query requests passing through the wireless controller, receiving a simulated domain name query reply packet from the wireless controller responding to the predefined domain name query, wherein the domain name query reply packet includes a predefined network address corresponding to the predefined domain name; and communicating with the wireless controller according to the predefined network address.

Another aspect of the present disclosure includes a communication method. The method includes detecting and intercepting a predefined domain name query request for a built-in predefined domain name from a wireless access point, by monitoring network data passing through a wireless controller; generating a simulated domain name query reply packet including a predefined network address corresponding to the predefined domain name; sending the simulated domain name query reply packet to the wireless access point; receiving a data connection request sent by the wireless access point according to the predefined the network address; and responding to the data connection request sent by the wireless access point.

Another aspect of the present disclosure includes a communication system. The communication system includes a wireless access point. The wireless access point includes a network configuration parameter processing module, a domain name query request initiating module, a domain name query reply packet receiving module, and a communication module. The network configuration parameter processing module is configured to automatically send a DHCP discovery request to a DHCP server after power on, and receive the network configuration parameters assigned by the DHCP server responding to the DHCP discovery request. The domain name query request initiating module is configured to initiate a query request for a built-in predefined domain name, based on a DNS server network address in the network configuration parameters. The domain name query reply packet receiving module is configured to receive a simulated domain name query reply packet in response to the query quest for the predefined domain name, wherein the domain name query reply packet includes the predefined network address corresponding to the predefined domain name. Further, the communication module is configured to communicate with a wireless controller according to the predefined network address.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1A:
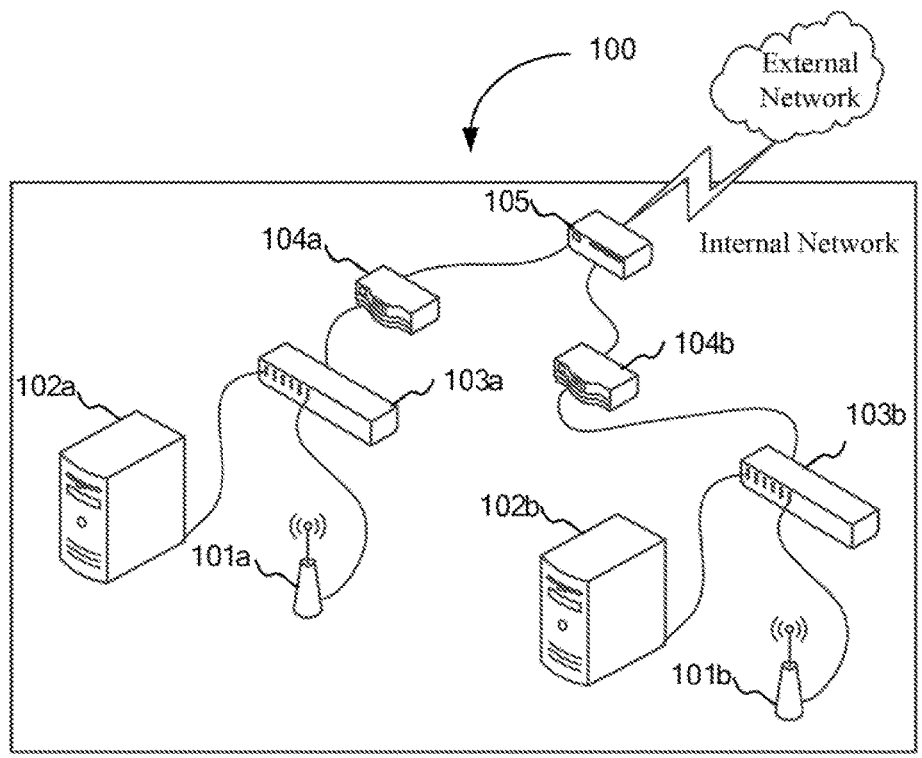
FIG. 1A illustrates an exemplary application environment consistent with the disclosed embodiments.

FIG. 1A illustrates an exemplary application environment consistent with the disclosed embodiments. As shown in FIG. 1A, a communication system 100 is provided. The communication system 100 may include one or more external network and one or more internal network. Specifically, the communication system 100 may include wireless access points 101a and 101b, and a wireless controller 105. The communication system 100 also include switches 103a and 103b, DHCP servers 102a and 102b, routers 104a and 104b. Any number of these components may be included, some of these components may be omitted, and other components may be included.

Further, a wireless access point and its corresponding DHCP server are connected to the same switch, and then connected to a wireless controller through a router. Specifically, as shown in FIG. 1A, the wireless controller 105 is deployed at the exit of the internal network, so that all the network data are transmitted through the wireless controller 105. The wireless access point 101a and its corresponding DHCP server 102a are connected to the same two-layer network through the switch 103a, and connected to an external network through the router 104a and the wireless controller 105. Similarly, wireless access points 101b and its corresponding DHCP server 102b are connected to the same two-layer network through the switch 103b, and connected to the external network through a router 104b and a wireless controller 105.

Figure 1B:
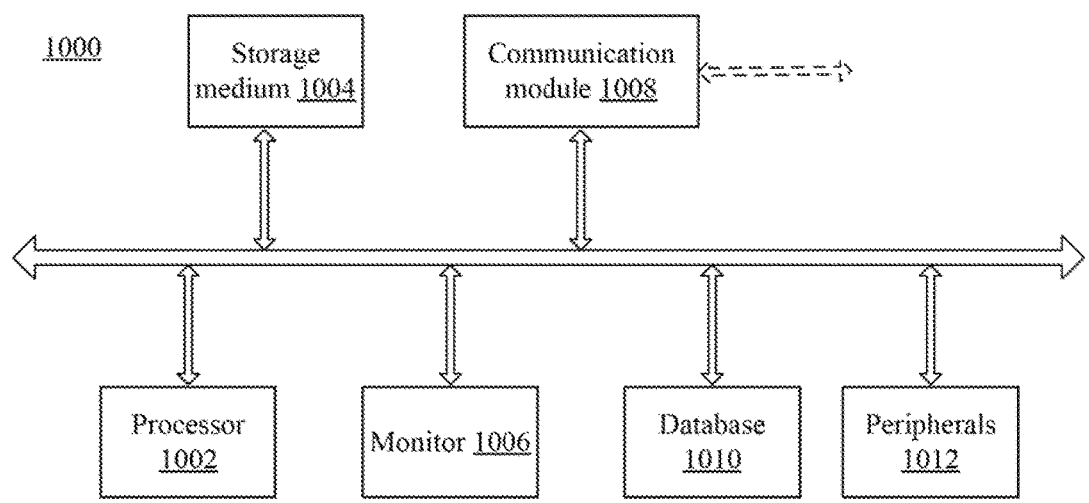
FIG. 1B illustrates a schematic block diagram of an exemplary computer system consistent with the disclosed embodiments.

The various components (e.g., wireless access points, DHCP servers, switches, routers, and wireless controllers) may be implemented on any appropriate computer system. FIG. 1B illustrates a computer system that may be used to implement the disclosed network congestion control methods and systems.

As shown in FIG. 1B, the computer system 1000 may include a processor 1002, a storage medium 1004, a monitor 1006, a communication module 1008, a database 1010, and peripherals 1012. Certain devices may be omitted and other devices may be included.

Processor 1002 may include any appropriate processor or processors. Further, processor 1002 can include multiple cores for multi-thread or parallel processing. Storage medium 1004 may include memory modules, such as ROM, RAM, flash memory modules, and erasable and rewritable memory, and mass storages, such as CD-ROM, U-disk, and hard disk, etc. Storage medium 1004 may store computer programs for implementing various processes, when executed by processor 1002.

Further, peripherals 1012 may include I/O devices such as keyboard and mouse, and communication module 1008 may include network devices for establishing connections through the communication network. Database 1010 may include one or more databases for storing certain data and for performing certain operations on the stored data, such as database searching.

Figure 2:
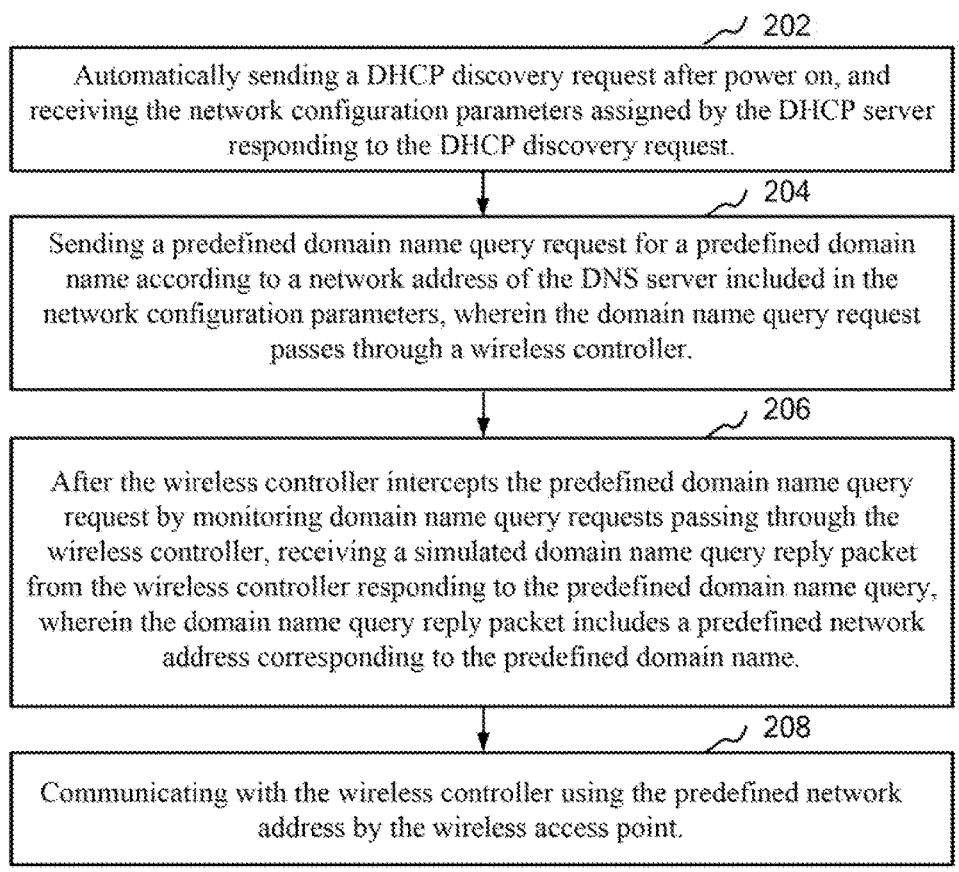
FIG. 2 illustrates a schematic flow chart of an exemplary communication method consistent with the disclosed embodiments.

As shown in FIG. 2, in an exemplary embodiment, a communication method is provided. The communication method is explained using the wireless access point 101a in the above-described FIG. 1A as a realization entity for illustrative purposes. The wireless access point 101a can be a simple wireless access equipment, or can also be a wireless router, a wireless network gateway, or a wireless network bridge.

As shown in FIG. 2, the communication method may include the following steps.

Step 202: automatically sending a DHCP discovery request after power on, and receiving the network configuration parameters assigned by the DHCP server responding to the DHCP discovery request.

Specifically, a network administrator (or a user) may connect the wireless access point 101a to the switch 103a, and turn on the power. The wireless access point 101a automatically sends a DHCP discovery request after power on, and the DHCP server 102*a* that belongs to the same two-layer network with the wireless access point 101*a*, upon receiving the DHCP discovery request, sends the network configuration parameters to the wireless access point 101*a*.

The DHCP discovery request is a request to locate an available DHCP server. The network configuration parameters are the necessary parameters for the activities of the wireless access point 101*a* in the network, and the network configuration parameters include, but not limited to: the network address of the wireless access point 101*a*, the network address of the network gateway of the wireless access point 101*a*, and the network address of the DNS server of the wireless access point 101*a*.

Step 204: according to the network address of the DNS server in the network configuration parameters, sending a predefined domain name query request for the built-in predefined domain name through the wireless controller.

More specifically, after the wireless access point 101*a* obtains the network configuration parameters, wireless access point 101*a* can uniquely locate its position in the network and access other network nodes. Because the wireless access point 101*a* may have a built-in predefined domain name, after obtaining its network configuration parameters, the wireless access point 101*a* can attempt to send a predefined domain name query request corresponding to the predefined domain name to the DNS server, according to the DNS server network address in the network configuration parameters.

The DNS server is used to covert a domain name into a network address. The DNS server network address in the network configuration parameters may be an external network address, i.e., a network address for the external network, not for the internal network. That is, in certain embodiments, no DNS server is deployed in the internal network. In one embodiment, the wireless controller 105 is deployed at the exit of the company internal network, and the predefined domain name query request sent by the wireless access point 101*a* is transmitted through the wireless controller 105.

In certain embodiments, the predefined domain name is an unregistered domain name. Since the role of a predefined domain name, as explained in the following descriptions, is not to visit a network based on the predefined domain name, the conflict between the unregistered predefined domain name and an existing domain name can be avoided. For example, a wireless access point 101*a* may send a predefined domain name query request with a predefined domain name such as "www.abc123789.com". Such domain name query request can also be called a DNS query request.

Step 206: after the wireless controller, by monitoring the domain name query requests passing through the wireless controller, intercepts a query request for the predefined domain name, the wireless controller responds to the query request for the predefined domain name and returns a simulated domain name query reply packet. The domain name query reply packet includes a predefined network address corresponding to the predefined domain name.

Specifically, the wireless controller 105 obtains all of the domain name query requests passing through the wireless controller 105. The wireless controller 105 checks whether a domain name query request is a query request for a predefined domain name. If the domain name query request is not a query request for a predefined domain name, the wireless controller 105 releases the domain name query request or simply let the domain name query pass through onto the external network without further processing the domain name query.

On the other hand, if the domain name query request is a query request for a predefined domain name, the wireless controller 105 discards the domain name query request, and simulates a DNS server by itself and further simulates a domain name query reply packet as a DNS server. Further, the wireless controller 105 sends the simulated domain name query reply packet to the wireless access point 101*a*.

Step 208: communicating with the wireless controller using the predefined network address by the wireless access point.

The domain name query reply packet includes at least a predefined network address corresponding to the predefined domain name, so the wireless access point 101*a* can communicate with the wireless controller 105 according to the predefined network address, by using the built-in predefined ports (such as port 7777). Thus, the discovery of the wireless controller 105 by the wireless access point 101*a* can be achieved. In an exemplary embodiment, the domain name query reply packet may also include a predefined port, so the wireless access point 101*a* can communicate with the wireless controller 105 according to the predefined network address and the predefined port included in the domain name query reply packet.

In an exemplary embodiment, the predefined network address is a virtual network address. The virtual network address can be any network address, for example, 1.2.3.4. A virtual network address is used instead of the real-work network address of the wireless controller itself, because not under all scenarios a wireless access point can directly communicate with the network address of a wireless controller. The virtual network address may make the communication more general for all scenarios.

With the above communication method, automatic discovery of a wireless controller and connection for communication can be realized after power on. Thus, the plug-and-play of a wireless access point can be achieved, without the need for additional deployment of the company internal DNS servers or DHCP server reconfiguration, lowering the deployment and maintenance cost. Further, as long as the query request for a predefined domain name sent by a wireless access point passes through a wireless controller, the wireless controller can intercept the query request for a predefined domain name, and simulate a domain name query reply packet, so that the wireless access point can find the wireless controller and communicate with the wireless controller. This method can be applied to a variety of network architectures, and the wireless controller can be discovered by the wireless access point and communicate with the wireless access point without changing network configuration or adding additional servers within the internal network.

Figure 3:
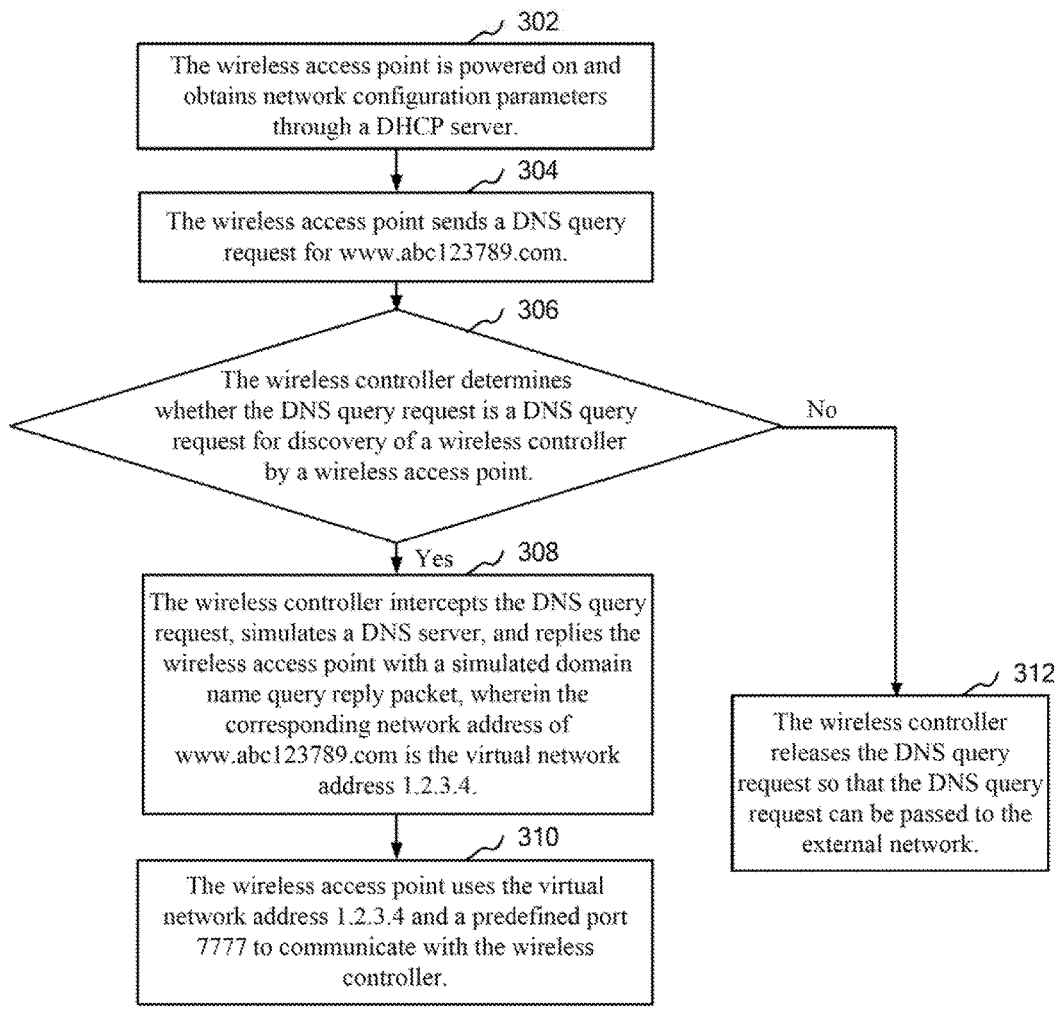
FIG. 3 illustrates a schematic flow chart of an exemplary detailed communication method consistent with the disclosed embodiments.

FIG. 3 illustrates a specific exemplary embodiment used to explain the disclosed communication method. As shown in FIG. 3, the communication method may include following steps.

Step 302: the wireless access point is powered on and obtains network configuration parameters through a DHCP server.

Step 304: the wireless access point sends a DNS query request for www.abc123789.com.

Step 306: the wireless controller determines whether the DNS query request is a DNS query request for discovery of a wireless controller by a wireless access point. If the DNS query request is a DNS query request for discovery of a wireless controller by a wireless access point (Step 306, yes), the process goes to Step 308 followed by Step 310. If the DNS query request is not a DNS query request for discovery of a wireless controller by a wireless access point (Step 306, no), the process goes to Step 312.

Step 308: the wireless controller intercepts the DNS query request, simulates a DNS server, and replies the wireless access point with a simulated domain name query reply packet, wherein the corresponding network address of www.abc123789.com is the virtual network address 1.2.3.4.

Step 310: the wireless access point uses the virtual network address 1.2.3.4 and a predefined port 7777 to communicate with the wireless controller.

Step 312, the wireless controller releases the DNS query request so that the DNS query request can be passed to the external network.

In an exemplary embodiment, the Step 208 may include: initiating, by the wireless access point, a data connection request carrying a predefined network address and a predefined port; and, after the wireless controller detects the data connection request by monitoring the network data passing through the wireless controller, redirecting, by the wireless controller, the data connection request to the wireless controller and responding to the data connection request.

In another exemplary embodiment, the steps for detecting a data connection request by monitoring the network data passing through the wireless controller includes: monitoring the network data passing through the wireless controller; and, if the destination address of the network data is the predefined network address and the destination port is the predefined port, determining the network data as a data connection request.

For example, the wireless access point 101a initiates a data connection request to a predefined port (such as port 7777) of the wireless controller 105. The wireless controller 105 detects network data passing through the wireless controller 105, and checks whether the network data meet the destination network address translation (DNAT) policy predefined by the wireless controller 105. If the network data does not meet the policy, the network data is released; if the network data meets the policy, for example, the destination network address is a predefined network address and the destination port is a predefined port, in this case, the network data is a data connection request sent by the wireless access point 101a. The wireless controller 105 redirects the data connection request to itself through the DNAT policy, so that the network data follows the packet receiving process of the wireless controller 105.

After the data connection request initiated by the wireless access point 101a is redirected to the wireless controller 105 itself, the application program of the wireless controller 105 for monitoring predefined ports processes the data connection request and responds to it, replying the wireless access point 101a. The automatic discovery of and connection to the wireless controller 105 by the wireless access point 101a after power on can thus be achieved.

Thus, according to disclosed embodiments, after the data connection request sent by the wireless access point 101 is received, by checking whether the data connection request passing through the wireless controller carry a predefined network address and predefined port, it can be determined whether the data connection request is a data connection request sent by the wireless access point 101a for communication with the wireless controller 105. Thus, the data connection request can be redirected to achieve the connection communication between the wireless access point 101a and the wireless controller 105. Therefore, the plug-and-play for the wireless access point can be achieved, greatly enhancing the operational convenience.

Figure 4:
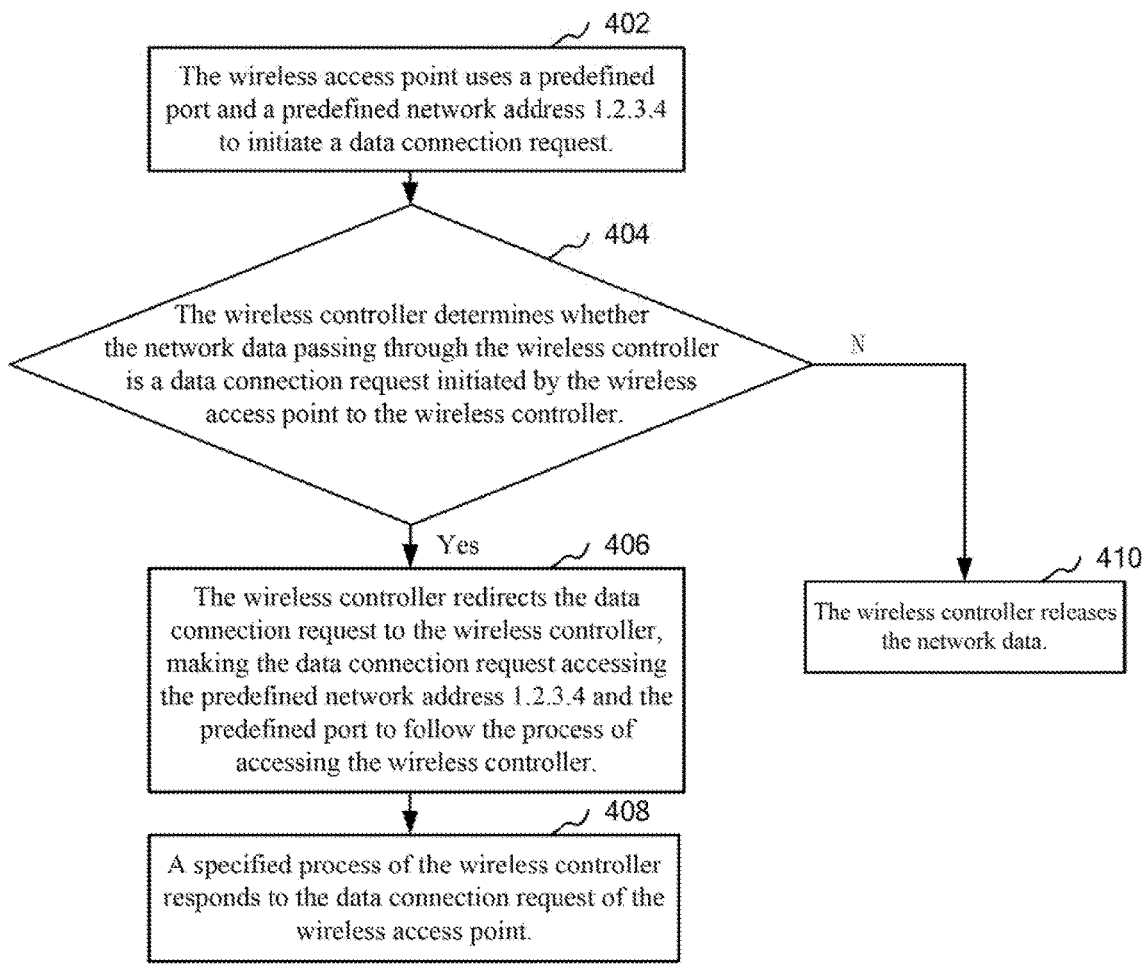
FIG. 4 illustrates a schematic flow chart of exemplary steps for communication with a wireless controller based on a predefined network address consistent with the disclosed embodiments.

FIG. 4 illustrates a specific exemplary communication process describing communication with a wireless controller according to a predefined network address. As shown in FIG. 4, the process may include the following steps.

Step 402: the wireless access point uses a predefined port and a predefined network address 1.2.3.4 to initiate a data connection request.

Step 404: the wireless controller determines whether the network data passing through the wireless controller is a data connection request initiated by the wireless access point to the wireless controller. Specifically, the determination is based on checking whether the destination address of the network data is a predefined network address and the destination port is a predefined port. If yes, the network data is determined to be a data connection request initiated by the wireless access point to the wireless controller. If the network data is a data connection request initiated by the wireless access point to the wireless controller, the process goes to Step 406, followed by Step 408. If the network data is not a data connection request initiated by the wireless access point to the wireless controller, the process goes to Step 410.

Step 406: the wireless controller redirects the data connection request to the wireless controller, making the data connection request accessing the predefined network address 1.2.3.4 and the predefined port to follow the process of accessing the wireless controller.

Step 408: a specified process of the wireless controller responds to the data connection request of the wireless access point.

Step 410: the wireless controller releases the network data.

Figure 5:
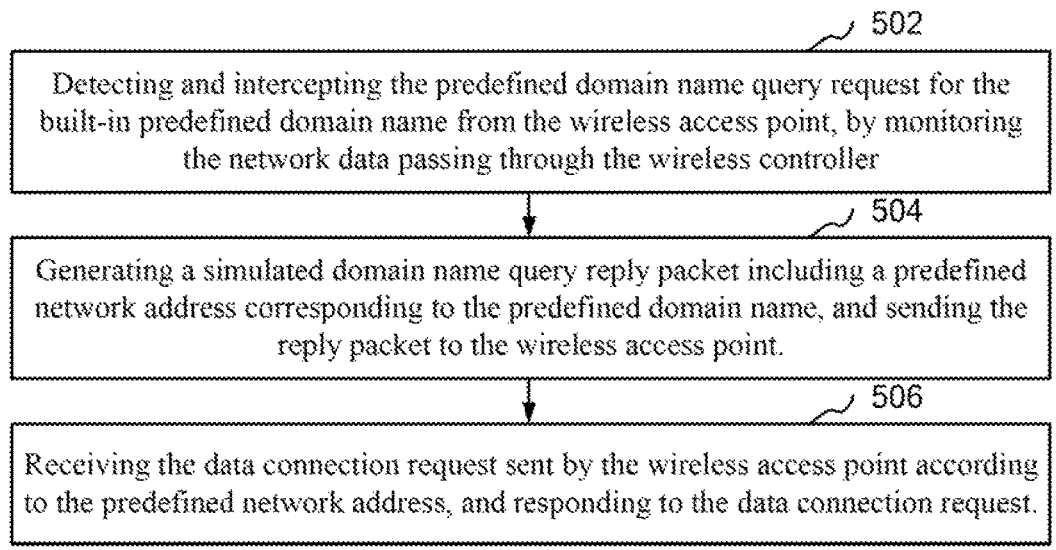
FIG. 5 illustrates a schematic flow chart of another exemplary communication method consistent with the disclosed embodiments.

FIG. 5 illustrates another exemplary communication method. As shown in FIG. 5, in an exemplary communication method, the wireless controller 105 is used as the implementation entity for illustrative purposes. The communication process may include the following steps.

Step 502: detecting and intercepting the predefined domain name query request for the built-in predefined domain name from the wireless access point, by monitoring the network data passing through the wireless controller.

Specifically, the administrator (or user) connects a wireless access point 101a to a switch 103a and turns on the power. After power on, the access point 101a automatically sends a DHCP discovery request, and the DHCP server 102a, which belongs to the same two layer network with the wireless access point 101a, receives the DHCP discovery request, and sends the network configuration parameters to the wireless access point 101a. The DHCP discovery request is a request to locate an available DHCP server. The network configuration parameters are the necessary parameters for the activities of the wireless access point 101a in the network, and the network configuration parameters include, but are not limited to: the network address of the wireless access point 101a, the network address of the network gateway of the wireless access point 101a, and the network address of the DNS server of the wireless access point 101a.

After a wireless access point 101a obtains network configuration parameters, it may uniquely locate its position in the network and access to other network nodes. The wireless access point 101a has a built-in or default predefined domain name. After obtaining its network configuration parameters, the wireless access point 101a can attempt to send a predefined domain name query request corresponding to the predefined domain name, according to the DNS server network address in the network configuration parameters. The DNS server is used to convert a domain name into a network address. In this exemplary embodiment, the wireless controller 105 is deployed at the exit of the company internal network, and the predefined domain name query request sent by the wireless access point 101a inevitably passes through the wireless controller 105.

In certain embodiments, the predefined domain name is an unregistered domain name. Since the role of a predefined domain name, as explained in the following descriptions, is not to visit a network based on the predefined domain name, the conflict between the unregistered predefined domain name and an existing domain name can be avoided. For example, a wireless access point 101a may send a predefined domain name query request with a predefined domain name such as "www.abc123789.com". Such domain name query request can also be called a DNS query request.

The wireless controller 105 obtains all of the domain name query requests passing through the wireless controller 105. The wireless controller 105 checks whether a domain name query request is a query request for a predefined domain name. If the domain name query request is not a query request for a predefined domain name, the wireless controller 105 releases the domain name query request or simply let the domain name query pass through onto the external network without further processing the domain name query. On the other hand, if the domain name query request is a query request for a predefined domain name, the wireless controller 105 discards the domain name query request.

Step 504: generating a simulated domain name query reply packet including a predefined network address corresponding to the predefined domain name, and sending the reply packet to the wireless access point.

Specifically, if the wireless controller 105 detects that the domain name query request is a query request for a predefined domain name, the wireless controller 105 discards the domain name query request, and simulates a DNS server by itself and further simulates a domain name query reply packet as a DNS server. Further, the wireless controller 105 sends the simulated domain name query reply packet to the wireless access point 101a.

Step 506: receiving the data connection request sent by the wireless access point according to the predefined network address, and responding to the data connection request.

The domain name query reply packet includes at least a predefined network address corresponding to the predefined domain name, so the wireless access point 101a can communicate with the wireless controller 105 according to the predefined network address, by using the built-in predefined ports (such as port 7777). Thus, the discovery of the wireless controller 105 by the wireless access point 101a can be achieved. In an exemplary embodiment, the domain name query reply packet may also include a predefined port, so the wireless access point 101a can communicate with the wireless controller 105 according to the predefined network address and the predefined port included in the domain name query reply packet.

In an exemplary embodiment, the predefined network address is a virtual network address. The virtual network address can be any network address, for example, 1.2.3.4. A virtual network address is used instead of the real-work network address of the wireless controller itself, because not under all scenarios a wireless access point can directly communicate with the network address of a wireless controller. The virtual network address may make the communication more general for all scenarios.

With the above communication method, automatic discovery of a wireless controller and connection for communication can be realized after power on. Thus, the plug-and-play of a wireless access point can be achieved, without the need for additional deployment of the company internal DNS servers or DHCP server reconfiguration, lowering the deployment and maintenance cost. Further, as long as the wireless controller can receive the query request for a predefined domain name sent by a wireless access point, the wireless controller can intercept the query request for a predefined domain name, and simulate a domain name query reply packet, so that the wireless access point can find the wireless controller and communicate with the wireless controller. This method can be applied to a variety of network architectures, and the wireless controller can be discovered by the wireless access point and communicate with the wireless access point without changing network configuration or adding additional servers within the internal network.

In an exemplary embodiment, the step 506 includes: monitoring the network data passing through the wireless controller from a wireless access point; if the destination address of the network data is the predefined network address and the destination port is the predefined port, determining the network data as a data connection request sent by the wireless access point to the wireless controller; and, redirecting the data connection request to the wireless controller and responding to the data connection request.

For example, the wireless access point 101a initiates a data connection request to a predefined port (such as port 7777) of the wireless controller 105. The wireless controller 105 detects network data passing through the wireless controller 105, and checks whether the network data meet the destination network address translation (DNAT) policy predefined by the wireless controller 105. If the network data does not meet the policy, the network data is released; if the network data meets the policy, for example, the destination network address is a predefined network address and the destination port is a predefined port, in this case, the network data is a data connection request sent by the wireless access point 101a. The wireless controller 105 redirects the data connection request to itself through the DNAT policy, so that the network data follows the packet receiving process of the wireless controller 105.

After the data connection request initiated by the wireless access point 101a is redirected to the wireless controller 105 itself, the application program of the wireless controller 105 for monitoring predefined ports processes the data connection request and responds to it, replying the wireless access point 101a. The automatic discovery of and connection to the wireless controller 105 by the wireless access point 101a after power on can thus be achieved.

Thus, according to disclosed embodiments, after the data connection request sent by the wireless access point 101 is received, by checking whether the data connection request passing through the wireless controller carry a predefined network address and predefined port, it can be determined whether the data connection request is a data connection request sent by the wireless access point 101a for communication with the wireless controller 105. Thus, the data connection request can be redirected to achieve the connection communication between the wireless access point 101a and the wireless controller 105. Therefore, the plug-and-play for the wireless access point can be achieved, greatly enhancing the operational convenience.

Figure 6:
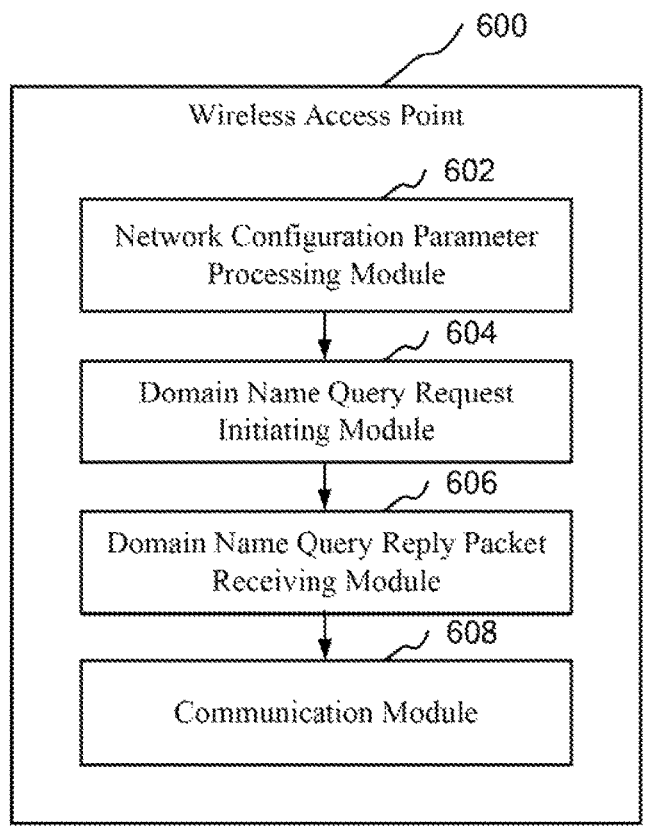
FIG. 6 illustrates a structural block diagram of an exemplary wireless access point consistent with the disclosed embodiments.

FIG. 6 illustrates an exemplary wireless access point. As shown in FIG. 6, the wireless access point 600 has the function for realizing the above communication method which is applicable to the wireless access point 101a. The wireless access point 600 may refer to a wireless access point device, or a communication apparatus, and may also refer to a first communication device. The wireless access point 600 includes a network configuration parameter processing module 602, a domain name query request initiating module 604, a domain name query reply packet receiving module 606, and a communication module 608.

The network configuration parameter processing module 602 is configured to automatically send a DHCP discovery request to a DHCP server after power on, and receive the network configuration parameters assigned by the DHCP server responding to the DHCP discovery request.

The domain name query request initiating module 604 is configured to initiate a query request for a built-in predefined domain name, which passes through the wireless controller, based on the DNS server network address in the network configuration parameters.

The domain name query reply packet receiving module 606 is configured to, after the wireless controller intercepts a query request for a predefined domain name by monitoring the domain name query requests passing through the wireless controller, receive the simulated domain name query reply packet from the wireless controller responding to the query quest for the predefined domain name, wherein the domain name query reply packet includes the predefined network address corresponding to the predefined domain name.

The communication module 608 is configured to communicate with the wireless controller according to the predefined network address.

In an exemplary embodiment, the communication module 608 is also configured to initiate a data connection request carrying a predefined network address and a predefined port, making the wireless controller to detect the data connection request by monitoring the network data passing through the wireless controller, and redirect the data connection request to the wireless controller and respond to the data connection request.

In an exemplary embodiment, the communication module 608 is also configured to initiate a data connection request carrying a predefined network address and a predefined port, making the wireless controller to monitor the network data passing through the wireless controller. If the destination address of the network data is a predefined network address and the destination port is a predefined port, the wireless controller determines the network data as a data connection request, redirects the data connection request to the wireless controller, and responds to the data connection request.

In an exemplary embodiment, the predefined domain name is an unregistered domain name, and/or, the predefined network address is a virtual network address.

The wireless access point 600 may automatically discover a wireless controller and connect for communication after power on. Thus, the plug-and-play of a wireless access point can be achieved, without the need for additional deployment of the company internal DNS servers or DHCP server reconfiguration, lowering the deployment and maintenance cost. Further, as long as the query request for a predefined domain name sent by a wireless access point passes through a wireless controller, the wireless controller can intercept the query request for a predefined domain name, and simulate a domain name query reply packet, so that the wireless access point can find the wireless controller and communicate with the wireless controller. This method can be applied to a variety of network architectures, and the wireless controller can be discovered by the wireless access point and communicate with the wireless access point without changing network configuration or adding additional servers within the internal network.

Figure 7:
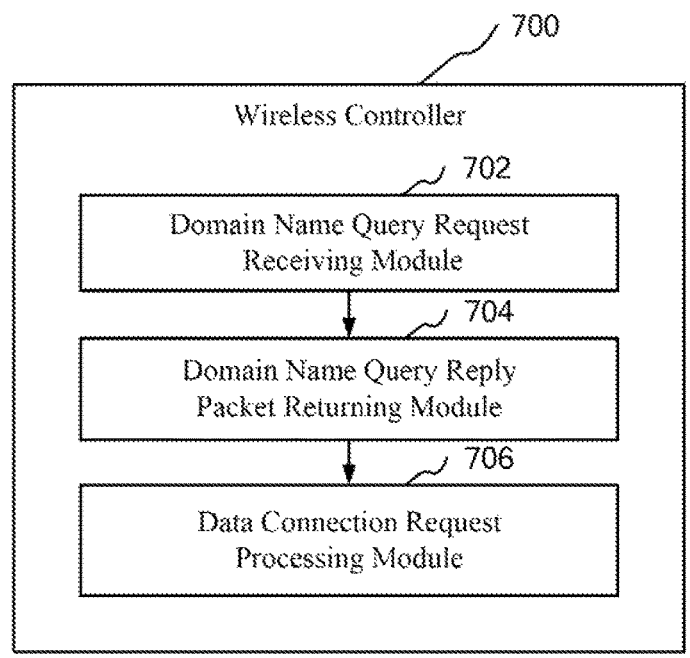
FIG. 7 illustrates a structural block diagram of an exemplary wireless controller consistent with the disclosed embodiments.

FIG. 7 illustrates an exemplary wireless controller. As shown in FIG. 7, the wireless controller 700 has the function for achieving the communication method which is applicable for the wireless controller 105. A wireless controller 700 may refer to a wireless controller device, or a communication device, and may also refer to a second communication device. A wireless controller 700 includes a domain name query request receiving module 702, a domain name query reply packet returning module 704, and data connection request processing module 706.

The domain name query request receiving module 702 is configured to detect, by monitoring the network data passing through the wireless controller, and intercept the predefined domain name query request, from a wireless access point, for the built-in predefined domain name of the wireless access point.

The domain name query reply packet returning module 704 is configured to generate a simulated domain name query reply packet including the predefined network address corresponding to the predefined domain name, and send the simulated domain name query reply packet to the wireless access point.

The data connection request processing module 706 is configured to receive the data connection request sent by the wireless access point according to the predefined network address, and respond to the data connection request.

In an exemplary embodiment, the data connection request processing module is also configured to monitor the network data passing through the wireless controller from a wireless access point. If the destination address of the network data is a predefined network address and the destination port is a predefined port, the wireless controller determines the network data as a data connection request sent by the wireless access point to the wireless controller, redirects the data connection request to the wireless controller, and responds to the data connection request.

In an exemplary embodiment, the predefined domain name is an unregistered domain name, and/or the predefined network address is a virtual network address.

With the wireless controller 700, the automatic discovery of a wireless controller and connection for communication can be realized after power on. Thus, the plug-and-play of a wireless access point can be achieved, without the need for additional deployment of the company internal DNS servers or DHCP server reconfiguration, lowering the deployment and maintenance cost. Further, as long as the wireless controller can receive the query request for a predefined domain name sent by a wireless access point, the wireless controller can intercept the query request for a predefined domain name, and simulate a domain name query reply packet, so that the wireless access point can find the wireless controller and communicate with the wireless controller. This method can be applied to a variety of network architectures, and the wireless controller can be discovered by the wireless access point and communicate with the wireless access point without changing network configuration or adding additional servers within the internal network.

Figure 8:
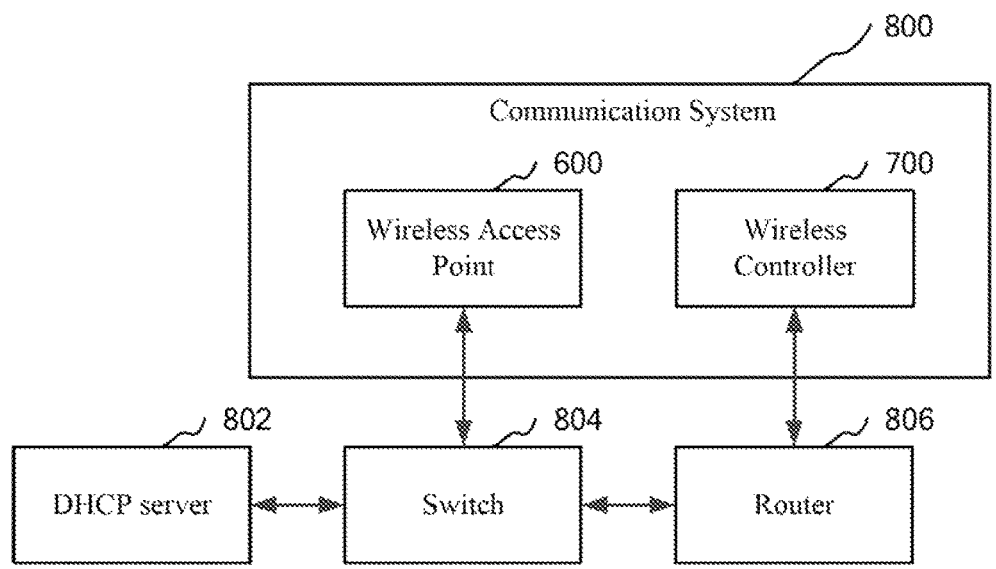
FIG. 8 illustrates another application environment block diagram of an exemplary communication system consistent with the disclosed embodiments.

FIG. 8 illustrates an exemplary communication system. As shown in FIG. 8, the communication system 800 includes a wireless access point 600 in any of the above exemplary embodiments and a wireless controller 700 in any of the above exemplary embodiments. The wireless access point 600 and the DHCP server 802 are connected to the switch 804, and further connected to the wireless controller 700 through the router 806.

The wireless access point 600 and the DHCP server 802 are connected to a switch 804, and further connected to a wireless controller 700 through a router 806, and the automatic discovery of a wireless controller and connection for communication can be realized after power on. Thus, the plug-and-play of a wireless access point can be achieved, without the need for additional deployment of the company internal DNS servers or DHCP server reconfiguration, lowering the deployment and maintenance cost.

Further, as long as the wireless controller can receive the query request for a predefined domain name sent by a wireless access point, the wireless controller can intercept the query request for a predefined domain name, and simulate a domain name query reply packet, so that the wireless access point can find the wireless controller and communicate with the wireless controller. This method can be applied to a variety of network architectures, and the wireless controller can be discovered by the wireless access point and communicate with the wireless access point without changing network configuration or adding additional servers within the internal network.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A communication method, comprising:
   automatically sending, by an access point (AP), a DHCP discovery request to a DHCP server after power on;
   receiving, by the AP, network configuration parameters assigned by the DHCP server responding to the DHCP discovery request, wherein the network configuration parameters include a network address of a DNS server;
   sending, by the AP, a predefined domain name query request for a predefined domain name according to the network address of the DNS server, wherein the predefined domain name query request passes through a wireless controller;
   intercepting, by the wireless controller, the predefined domain name query request by monitoring domain name query requests passing through the wireless controller;
   in response to the predefined domain name query request, simulating, by the wireless controller, the DNS server to generate and send a simulated domain name query reply packet;
   receiving, by the AP, the simulated domain name query reply packet, wherein the simulated domain name query reply packet includes a predefined network address corresponding to the predefined domain name; and
   communicating, by the AP, with the wireless controller according to the predefined network address.

2. The method according to claim 1, wherein communicating, by the AP, with the wireless controller according to the predefined network address further includes:
   initiating, by the AP, a data connection request carrying the predefined network address and a predefined port;
   detecting, by the wireless controller, the data connection request by monitoring network data passing through the wireless controller; and
   redirecting, by the wireless controller, the data connection request to the wireless controller and responding to the data connection request.

3. The method according to claim 2, wherein detecting, by the wireless controller, the data connection request by monitoring network data passing through the wireless controller further includes:
   monitoring the network data passing through the wireless controller; and
   when a destination address of the network data is the predefined network address and a destination port of the network data is the predefined port, determining that the network data is the data connection request.

4. The method according to claim 1, wherein the predefined domain name is an unregistered domain name and the predefined network address is a virtual network address.

5. A communication system, comprising:
   a wireless access point, and
   a wireless controller,
   wherein:
   the wireless access point is configured to:
     automatically send a DHCP discovery request to a DHCP server after power on, and receive network configuration parameters assigned by the DHCP server responding to the DHCP discovery request, wherein the network configuration parameters include a network address of a DNS server;
     initiate a query request for a predefined domain name, based on the network address of the DNS server;
     receive a simulated domain name query reply packet in response to the query quest for the predefined domain name, wherein the simulated domain name query reply packet includes a predefined network address corresponding to the predefined domain name; and
     communicate with the wireless controller according to the predefined network address, and
   the wireless controller is configured to simulate the DNS server to generate the simulated domain name query reply packet in response to the query quest for the predefined domain name.

6. The communication system according to claim 5, wherein the wireless access point is also configured to initiate a data connection request carrying the predefined network address and a predefined port.

7. The communication system according to claim 5, wherein the predefined domain name is an unregistered domain name and the predefined network address is a virtual network address.

8. The communication system according to claim 6, wherein the wireless controller is further configured to:
   detect and intercept the query request for the predefined domain name from the wireless access point, by monitoring network data passing through the wireless controller, wherein the query request includes the predefined network address corresponding to the predefined domain name;
   after generating the simulated domain name query reply packet in response to the query quest for the predefined domain name, send the simulated domain name query reply packet to the wireless access point; and
   receive the data connection request sent by the wireless access point according to the predefined network address, and respond to the data connection request.

9. The communication system according to claim 8, wherein the-wireless controller is configured to monitor the network data passing through the wireless controller from the wireless access point.

10. The communication system according to claim 9, wherein the wireless controller is further configured to:
  when a destination address of the network data is the predefined network address and a destination port is the predefined port, determine that the network data is the data connection request sent by the wireless access point to the wireless controller; and
  redirect the data connection request to the wireless controller and respond to the data connection request.

11. The communication system according to claim 8, wherein the predefined domain name is an unregistered domain name and the predefined network address is a virtual network address.

12. The communication system according to claim 8, further comprising:
the DHCP server, a switch, and a router,
  wherein the wireless access point and the DHCP server are connected to the switch, and further connected to the wireless controller through the router.

13. The communication system according to claim 12, wherein:
  the communication system includes one or more internal networks and one or more external networks,
  the wireless access point and the DHCP server are disposed within an internal network of the communication system, and are connected to an external network through the router and the wireless controller,
  the wireless controller is deployed at exist of the internal network, and
  the DNS server is disposed outside of the internal network.

* * * * *